United States Patent [19]
Chen et al.

[11] Patent Number: 5,852,163
[45] Date of Patent: Dec. 22, 1998

[54] PROCESS FOR PREPARING HYDROXY-FUNCTIONALIZED POLYESTERS

[75] Inventors: H. David Chen, Buena Park, Calif.;
Michael N. Mang, Midland, Mich.;
Jerry E. White, Lake Jackson, Tex.

[73] Assignee: The Dow Chemical Company, Midland, Mich.

[21] Appl. No.: 926,954

[22] Filed: Sep. 10, 1997

[51] Int. Cl.$^6$ ................................................. C08G 63/00
[52] U.S. Cl. ...................... 528/274; 528/176; 528/193; 528/194; 528/272; 528/275
[58] Field of Search ................... 528/176, 193, 528/194, 272, 274, 275

[56] References Cited

U.S. PATENT DOCUMENTS 4,612,156  9/1986  Heinemeyer et al. ............. 264/176 R
5,134,201  7/1992  Billovits et al. ......................... 525/423
5,171,820  12/1992  Mang et al. ............................... 528/87

OTHER PUBLICATIONS

Klee et al., "High–Molecular Weight Diepoxide–Dicarboxylic Acid Addition Polymers", Polymer Bulletin 35, pp. 79–85 (1995).

*Primary Examiner*—Terressa Mosley
*Attorney, Agent, or Firm*—Nemia C. Damocles

[57] ABSTRACT

A process for preparing a thermoplastic hydroxy-functionalized polyesters comprises contacting a dicarboxylic acid or a mixture of dicarboxylic acids with a diepoxide in the presence of a monofunctional carboxylic acid and a catalyst, and in the absence of a solvent under conditions sufficient to form the hydroxy-functionalized polyesters.

15 Claims, No Drawings

PROCESS FOR PREPARING HYDROXY-FUNCTIONALIZED POLYESTERS

BACKGROUND OF THE INVENTION

This invention relates to a process for preparing hydroxy-functionalized polyesters.

It is known in U.S. Pat. No. 5,171,820 to prepare hydroxy-functionalized polyesters by allowing a dicarboxylic acid and a diglycidyl ether to react in a solvent containing a quaternary ammonium halide as an initiator. This patent teaches that a monofunctional carboxylic acid can be added before the product is recovered to consume residual epoxy functionalities that might lead to cross-linking during fabrication of the resin to an article. While this process yields high molecular weight thermoplastic hydroxy-functionalized polyesters, recovery of the product requires separation of the hydroxy-functionalized polyesters either by precipitation from a non-solvent or by devolatilization of the solvent, either one of which requires the disposal or reclamation of large amounts of solvent.

Clearly, a melt reaction process that eliminates the need for solvent in the preparation of thermoplastic hydroxy-functionalized polyesters would be desirable. However, previous efforts to prepare hydroxy-functionalized polyesters in the melt involved a low-temperature process that is impractically slow, requiring reaction times in excess of four to eight hours to produce a polymer with appreciable molecular weight. See, for example, Klee et al., Polymer Bulletin, 1995, Vol. 35, Pages 79–85. In addition, the hydroxy-functionalized polyesters produced by this process cross-link upon additional heating, as described in Table 1 of this article and therefore are not true thermoplastics.

It would be desirable to provide a process for preparing hydroxy-functionalized polyesters which eliminates the need for solvents and, at the same time, produces melt-stable, thermoplastic hydroxy-functionalized polyesters.

SUMMARY OF THE INVENTION

In one aspect, the present invention is a process for preparing thermoplastic hydroxy-functionalized polyesters which comprises contacting a dicarboxylic acid or a mixture of dicarboxylic acids with a diepoxide in the presence of a monofunctional carboxylic acid and a catalyst, and in the absence of a solvent under conditions sufficient to form the hydroxy-functionalized polyesters.

DETAILED DESCRIPTION OF THE INVENTION

The poly(hydroxy ester ethers) prepared by the process of the present invention have repeating units represented by the formula:

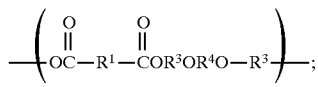

wherein $R^1$ individually represents a divalent organic moiety which is predominantly hydrocarbylene, or a combination of different organic moieties which are predominantly hydrocarbylene; $R^3$ is

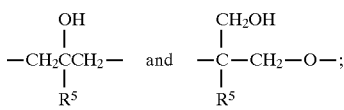

$R^3$ is

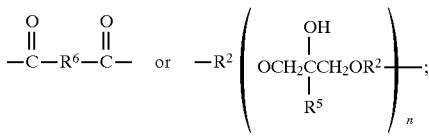

wherein $R^2$ is a divalent organic moiety which is predominantly hydrocarbylene or

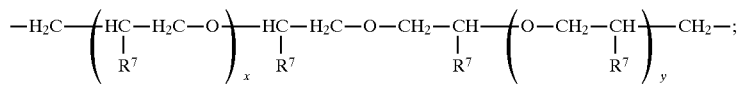

$R^5$ is hydrogen or alkyl, $R^6$ is independently an organic moiety which is predominantly hydrocarbylene, $R^7$ is independently hydrogen or methyl; and x and y are independently integers from 0 to 100.

The term "predominantly hydrocarbylene" is defined as a divalent radical that is predominantly hydrocarbon, but which optionally contains a minor amount of a heteroatomic moiety such as oxygen, sulfur, imino, sulfonyl, and sulfoxyl.

Representative divalent organic moieties useful as $R^1$, $R^2$ and $R^6$ include alkylene, cycloalkylene, alkylenearylene, poly(alkyleneoxyalkylene), alkylenethioalkylene, alkylenesulfonylalkylene, alkylene substituted with at least one hydroxyl group, cycloalkylene substituted with at least one hydroxyl group, alkylenearylene substituted with at least one hydroxyl group, poly(alkyleneoxyalkylene) substituted with at least one hydroxyl group, alkylenethioalkylene substituted with at least one hydroxyl group, alkylenesulfonylalkylene substituted with at least one hydroxyl group; arylene, dialkylenearylene, diaryleneketone, diarylenesulfone, diarylene oxide and diarylene sulfide.

In the more preferred hydroxy-functional polyethers, $R^1$, $R^2$ and $R^6$ are independently methylene, ethylene, propylene, butylene, pentamethylene, hexamethylene, heptamethylene, octamethylene, nonamethylene, decamethylene, dodecamethylene, 1,4-cyclohexylene, 1,3-cyclohexylene or 1,2-cyclohexylene, any of which can be optionally substituted with at least one hydroxyl group, p-phenylene, m-phenylene, 2,6-naphthalene, diphenyleneisopropylidene, sulfonyldiphenylene, carbonyldiphenylene, oxydiphenylene, or 9,9-fluorenediphenylene and n is from 0 to 10.

In the preferred polymers, $R^1$, $R^2$ and $R^6$ are independently alkylene, cycloalkylene, alkylenearylene, alkyleneoxyalkylene, poly(alkyleneoxyalkylene), alkyleneamidealkylene, poly(alkyleneamidealkylene), alkylenethioalkylene, poly(alkylenethioalkylene), alkylenesulfonylalkylene, poly(alkylenesulfonylalkylene), any of which can be optionally substituted with one or more hydroxy groups, arylene, dialkylenearylene, diaryleneketone, diarylenesulfone, diarylene oxide, alkylidene-diarylene, diarylene sulfide, or a combination of these moieties.

In the more preferred polymers, $R^1$ is ethylene, propylene, butylene, pentamethylene, hexamethylene, heptamethylene, octamethylene, nonamethylene, decamethylene, dodecamethylene, 1,4-cyclohexylene, 1,3-cyclohexylene or 1,2-cyclohexylene, any of which can be optionally substituted with at least one hydroxyl group; $R^2$ and $R^6$ are independently methylene, ethylene, propylene, butylene, pentamethylene, hexamethylene, heptamethylene, octamethylene, nonamethylene, decamethylene, dodecamethylene, 1,4-cyclohexylene, 1,3-cyclohexylene or 1,2-cyclohexylene, optionally substituted with at least one hydroxyl group.

More preferably, $R^1$ and $R^6$ are represented by the formula:

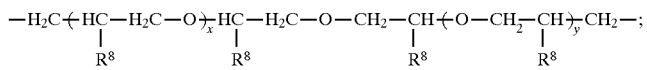

and $R^2$ is represented by the formula:

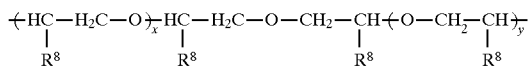

wherein $R^8$ is independently hydrogen or methyl and x and y are independently 0 to 100.

In the most preferred polymers, $R^1$ and $R^6$ are independently ethylene, butylene, hexamethylene, m-phenylene, p-phenylene or 2,6-naphthalene; $R^2$ is independently m-phenylene, p-phenylene, naphthylene, diphenyleneisopropylidene, sulfonyldiphenylene, carbonyldiphenylene, oxydiphenylene or 9,9-fluorenediphenylene; $R^5$ is hydrogen; $R^7$ is independently phenyl, methyl, or:

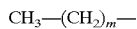

wherein m is 1 to 30.

Generally, the polymers of the present invention can be prepared by reacting dicarboxylic acids and diepoxides in the presence of a monofunctional carboxylic acid and a catalyst and in the absence of a solvent under conditions sufficient to form the hydroxy-functionalized polyesters.

Dicarboxylic acids which can be employed in the practice of the present invention include succinic acid, adipic acid, suberic acid, azaleic acid, sebacic acid, 1,10-decanedicarboxylic acid, 1,12-dodecanedicarboxylic acid, 1,4-cyclohexanedicarboxylic acid, tartaric acid, terephthalic acid and isophthalic acid.

Diepoxides which can be employed in the practice of the present invention include the diglycidyl ethers of dihydric phenols, such as those described in U.S. Pat. Nos. 5,246,751; 5,115,075; 5,089,588; 4,480,082 and 4,438,254, all of which are incorporated herein by reference, or the diglycidyl esters of dicarboxylic acids such as those described in U.S. Pat. No. 5,171,820. Other suitable diepoxides include α,ω-diglycidyloxyisopropylidene-bisphenol-based epoxy resins (commercially known as D.E.R.® 300 and 600 series epoxy resins), αω-diglycidyloxy tetrabromoisopropylidene-bisphenol-based phenoxy resins, such as Quatrex® 6410, both a product of The Dow Chemical Company. Preferred diepoxides are the epoxy resins having an epoxy equivalent weight of from about 100 to about 4000. Most preferred diepoxides are the diglycidyl ethers of bisphenol A; 4,4'-sulfonyldiphenol; 4,4-oxydiphenol; 4,4'-dihydroxybenzophenone; resorcinol; hydroquinone; 9,9'-bis(4-hydroxyphenyl)fluorene; 4,4'-dihydroxybiphenyl or 4,4'-dihydroxy-α-methylstilbene and the diglycidyl esters of the dicarboxylic acids mentioned previously.

Monofunctional carboxylic acids which can be employed in the practice of the present invention include benzoic acid, acetic acid and propionic acid.

In general, the reaction of the dicarboxylic acid and diepoxide requires a catalyst or any material capable of catalyzing the reaction. While any material capable of catalyzing the reaction can be used, the preferred catalysts are the onium catalysts. Preferred onium catalysts include the phosphonium or ammonium salt catalysts. More preferred onium catalysts include ethyltriphenylphosphonium iodide, tetraphenylphosphonium bromide and tetrakis(n-butyl)ammonium bromide and the corresponding chloride, iodide, bromide, acetate, formate, phosphate, borate, trifluoroacetate, oxalate and bicarbonate, with tetrakis(n-butyl)ammonium bromide being most preferred.

The conditions at which the polymerization reaction is most advantageously conducted are dependent on a variety of factors, including the specific reactants and catalyst employed, if any. In general, the reaction is conducted under a non-oxidizing atmosphere such as a blanket of nitrogen or other inert gases. The reactions are conducted neat (without solvent or other diluents).

The process of the present invention can be conducted in an open container or in an extruder or in an injection molding machine.

The following examples are for illustrative purposes only and are not intended to limit the scope of this invention. Unless otherwise indicated, all parts and percentages are by weight.

EXAMPLE 1

A mixture of bisphenol A-diglycidyl ether (epoxy equivalent weight=171.19; 20.0 g, 0.058 mol), adipic acid (8.54 g, 0.058 mol), benzoic acid (0.14 g, 0.01 equiv.) and tetrabutylammonium bromide (0.76 g, 0.002 mol) is mechanically stirred in a four-ounce jar and heated with a mantel to a jacket temperature of 150° C. to 160° C. Upon melting and dissolution of the reactants, the temperature of the reaction mixture rises exothermically to 164° C., after which the stirred melt is maintained at about 140° C. Specimens removed at various intervals (see Table 1 below) after the onset of reaction are soluble in dimethylformamide (DMF), and thus uncross-linked, and have the following characteristics:

TABLE 1

| Reaction Time, min | MW[a] | Mn[a] | $\eta_{inh}$, dL/g[b] |
|---|---|---|---|
| 5 | 43,770 | 11899 | 0.37 |
| 10 | 56011 | 13,577 | 0.41 |
| 120 | 146,387 | 13,622 | 0.54 |

[a]Determined by Gel Permeation Chromatography relative to polystyrene standards.
[b]Inherent viscosity measured at 25° C. for 0.5 g of sample in 100 mL of DMF.

The results summarized in Table 1 indicate that the process of the present invention rapidly yields high-molecular-weight hydroxy-functionalized polyesters, yet the material can tolerate extended exposure to high temperature without cross-linking.

Comparative Example A

The procedure described in Example 1 is repeated with a reaction mixture not containing benzoic acid. The mixture gives a cross-linked, insoluble gel within 30 minutes, showing that the presence of benzoic acid is necessary for the preparation of soluble, thermoplastic product.

EXAMPLE 2

A mixture of bisphenol A-diglycidyl ether (epoxy equivalent weight=171.19; 20.0 g, 0.058 mol), adipic acid (8.54 g, 0.058 mol), benzoic acid (0.14 g, 0.01 equiv) and benzyltriethylammonium chloride (0.53 g, 0.002 mol) is allowed to polymerize as in Example 1. After a reaction time of two hours, the product hydroxy-functionalized polyester remains soluble and thermally processable and has $\eta_{inh}$=0.50

Comparative Example B

A reaction mixture identical to that of Example 2, but not containing adipic acid, is homogeneously mixed for five to ten minutes at 140° C. to 150° C. The obtained clear reaction mixture is deposited into six small vessels and allowed to polymerize for 2 hours at 150° C. to 160° C. Specimens are periodically removed from the reaction mixture, and their solubility and $\eta_{inh}$ are determined and results are listed in Table 2.

The above procedure is identical to that described in Klee et al., *Polymer Bulletin*, 1995, Vol. 35, Page 80, with the exception that the reaction is conducted at a high temperature of 150° C. to 160° C., instead of Klee's low temperature of 90° C., to produce high molecular weight hydroxy-functionalized polyesters within two hours rather than the four-hour reaction time required by Klee's method.

TABLE 2

| Reaction Time, min | Solubility in DMF | $\eta_{inh}$, dL/g[b] |
| --- | --- | --- |
| 18 | Yes | 0.29 |
| 29 | Yes | 0.64 |
| 45 | Yes | 0.72 |
| 60 | No | — |

[b]Inherent viscosity measured at 25° C. for 0.5 g of sample in 100 mL of DMF.

The results summarized in Table 2 indicate that while high-molecular-weight PHEE can be produced in the absence of benzoic acid within 45 minutes, the product thus formed is thermally unstable and, with further heating, is formed into an insoluble, cross-linked resin incapable of thermoplastic fabrication.

The polymers prepared by the process of the present invention are useful in preparing barrier containers and films, and as molding, extrusion and casting resins. in fabricating molded, extruded or foamed articles, containers, films, film laminates, or coatings using conventional fabricating techniques such as extrusion, compression molding, injection molding, blow molding and similar fabrication techniques commonly used to produce such articles. Examples of such articles include films, foams, sheets, pipes, rods, bags and boxes.

What is claimed is:

1. A process for preparing thermoplastic hydroxy-functionalized polyesters which comprises contacting a dicarboxylic acid or a mixture of dicarboxylic acids with a diepoxide in the presence of a monofunctional carboxylic acid and a catalyst, and in the absence of a solvent under conditions sufficient to form the hydroxy-functionalized polyesters.

2. The process of claim 1 wherein the dicarboxylic acid is succinic acid, adipic acid, suberic acid, azaleic acid, sebacic acid, 1,10-decanedicarboxylic acid, 1,12-dodecanedicarboxylic acid, 1,4-cyclohexanedicarboxylic acid, tartaric acid, terephthalic acid, isophthalic acid or combinations thereof.

3. The process of claim 1 wherein the diepoxide is a diglycidyl ether of a dihydric phenol.

4. The process of claim 3 wherein the diepoxide is the diglycidyl ether of bisphenol A; 4,4'-sulfonyldiphenol; 4,4-oxydiphenol; 4,4'-dihydroxybenzophenone; resorcinol; hydroquinone; 9,9-bis(4-hydroxyphenyl)fluorene; 4,4'-dihydroxybiphenyl, 4,4'-dihydroxy-α-methylstilbene, or combinations thereof.

5. The process of claim 1 wherein the diepoxide is a diglycidyl ester of a dicarboxylic acid.

6. The process of claim 5 wherein the diglycidyl ester is a diglycidyl ester of succinic acid; adipic acid; suberic acid; azaleic acid; sebacic acid; 1,10-decanedicarboxylic acid; 1,12-dodecanedicarboxylic acid; 1,4-cyclohexanedicarboxylic acid; tartaric acid; terephthalic acid, isophthalic acid, or combinations thereof.

7. The process of claim 1 wherein the diglycidyl ether or diglycidyl ester has an epoxy equivalent weight of from about 100 to about 4000.

8. The process of claim 1 wherein the catalyst is an onium catalyst.

9. The process of claim 8 wherein the onium catalyst is a phosphonium or ammonium salt catalyst.

10. The process of claim 9 wherein the onium catalyst is ethyltriphenylphosphonium iodide, tetraphenylphosphonium bromide or tetrakis(n-butyl)ammonium bromide, chloride, iodide, acetate, formate, phosphate, borate, trifluoroacetate, oxalate or bicarbonate.

11. The process of claim 10 wherein the onium catalyst is tetrakis(n-butyl)ammonium bromide.

12. The process of claim 1 wherein the catalyst is present in an amount of from about 0.001 to 10 mol percent, based on the number of moles of dicarboxylic acid in the reaction mixture.

13. The process of claim 1 wherein the monofunctional carboxylic acid is acetic acid, propionic acid or benzoic acid.

14. A poly(hydroxy ester ether) prepared by the process of claim 1.

15. A process for preparing a thermoplastic hydroxy-functionalized polyesters which comprises contacting a dicarboxylic acid or a mixture of dicarboxylic acids with a diepoxide in the presence of a monofunctional carboxylic acid and a catalyst, and in the absence of a solvent at a temperature of from about 150° C. to about 160° C. until the reaction mixture is melted.

\* \* \* \* \*